United States Patent [19]

Hubner

[11] Patent Number: 4,524,273

[45] Date of Patent: Jun. 18, 1985

[54] METHOD AND APPARATUS FOR GAMMA RAY WELL LOGGING

[75] Inventor: Bernard G. Hubner, Houston, Tex.

[73] Assignee: Dresser Industries, Inc., Dallas, Tex.

[21] Appl. No.: 485,151

[22] Filed: Apr. 15, 1983

[51] Int. Cl.³ .............................................. G01V 5/12
[52] U.S. Cl. .................................... 250/269; 250/264
[58] Field of Search ............... 250/269, 266, 265, 261, 250/264

[56] References Cited

U.S. PATENT DOCUMENTS

| | | | |
|---|---|---|---|
| 2,659,011 | 11/1953 | Youmans et al. | 250/261 |
| 3,321,625 | 5/1967 | Wahl | 250/268 |
| 3,858,037 | 12/1974 | Moore et al. | 364/422 |
| 3,864,569 | 2/1975 | Tittman | 250/264 |

FOREIGN PATENT DOCUMENTS 43313  1/1982  European Pat. Off. ............ 250/269

OTHER PUBLICATIONS

W. Bertozzi, D. V. Ellis and J. S. Wahl, "The Physical Foundation of Formation Lithology Logging with Gamma Rays", *Geophysics*, vol. 46, No. 10, (Oct. 1981), pp. 1439–1455.

"Lithology Density Tool", Schlumberger Brochure, (Author and Date Unknown).

*Primary Examiner*—Janice A. Howell
*Assistant Examiner*—Constantine Hannaher
*Attorney, Agent, or Firm*—Patrick H. McCollum; Richard M. Byron

[57] ABSTRACT

A radioactive logging source carried by a logging tool injects gamma rays into the formation. A detector generates a pulse for each gamma ray incident upon the detector having an amplitude proportional to the gamma ray energy. Electrical signals corresponding to each such amplitude are delivered to the surface. These incident gamma rays originate from the formation as well as from a monitor source of gamma rays of known energy adjacent the detector. An energy peak from the gamma ray energy spectra transmitted to the surface corresponding to gamma rays of known energy from the monitor source is accurately identified. At the surface, the peak is tracked during the logging procedure and a control signal functionally related to observed monitor peak shifts generated and delivered to the logging tool. A control circuit alters magnitude of the high voltage supply providing power to the detector in response to the control signal.

20 Claims, 10 Drawing Figures

METHOD AND APPARATUS FOR GAMMA RAY WELL LOGGING

BACKGROUND OF THE INVENTION

This invention relates to radioactivity well logging, and, more particularly, to novel methods and apparatus for identifying the density and lithology of subsurface earth formations.

It has been known that gamma rays of a known energy spectrum, after introduction into a subsurface earth formation, will undergo mechanisms discussed in the literature such as absorptions due to the photoelectric effect and Compton scattering. These mechanisms will alter the energy spectrum of gamma rays exiting the formation as a function of formation characteristics. Thus, very valuable information regarding formation parameters such as density, lithology, and the like, are contained in the resultant spectrum.

More particularly, it has been demonstrated that the ratios of count rates of such exiting gamma rays for energies about the (50-100 Kev)/(200-540 Kev) range exhibit a strong functional relationship to the photoelectric cross-section $P_e$ and thus the lithology of the formation. In like manner, it has further been known that the count rate of such gamma rays in higher energy ranges of, say, 200-540 Kev, exhibit a like strong functional dependence upon formation density, $\rho$.

Accordingly, it has been conventional to provide a logging tool having a source of gamma rays of a known spectrum and intensity which are introduced into the formation, and a means for detecting gamma rays incident upon the tool and originating from the formation. Representative such systems and a discussion of their general theory of operation may be seen depicted in U.S. Pat. No. 3,864,569 to Tittman; U.S. Pat. No. 3,858,037 to Moore, et al; and U.S. Pat. No. 3,321,625 to Wahl.

Due to the aforementioned significance of the relative energy levels of the detected gamma rays, in these systems it is conventional to provide means for developing a count rate of gamma rays having energies within preselected energy bands. Accordingly, electronic circuit means are provided in the tool known as energy window discriminators through which only pulses of a preselected voltage amplitude range are permitted to pass for counting. Since these pulses correspond in amplitude to the detected gamma ray energies from a gamma ray detector, the desired count rate of gamma rays within a preselected energy band of interest is thus made available.

However, several serious disadvantages are present in the hereinabove described systems. First, the discriminators are typically comprised of analog circuitry particularly sensitive to adverse borehole conditions of extreme temperature, vibration, and the like. These circuits have been known to drift such that a count rate from such a discriminator thought to correspond to one energy range might, in reality, correspond to that of gamma rays of a different range.

Moreover, each discriminator is conventionally comprised of a separate circuit. Thus the number of discriminators and correlative energy bands for which count rates may be provided is limited by the size constraints of logging tools. Accordingly, such count rates are typically only provided for two energy bands. The first band corresponds to "soft" or relatively low energy level gamma rays typically within the range of 60-100 Kev wherein primarily lithology information is contained. The other band corresponds to "hard" or relatively high energy level gamma rays approximately within the range of 200-550 Kev wherein the functional relationship between gamma ray energies detected in the formation is strongly dependent upon formation densities.

Still further, not only is the resolution of the count rates in corresponding energy bands limited due to the aforementioned borehole conditions and limited number of discriminators available. Due to the "hard wired" nature of the downhole discriminator circuitry there is little if any opportunity to alter the windows in terms of their number, energy range, and the like.

Due to the hereinbefore mentioned limitations of prior apparatus (including the limited number of window discriminators and their inherent instability), it was further difficult to locate with desired precision in the data transmitted uphole an energy calibration point, such as a 660 Kev energy peak from an internal monitor cesium source, which would permit translation of count rates to actual energy spectra. Moreover, no effective way was provided to check gamma ray detector resolution so as to check discriminator window accuracies and to compensate for resolution effects on observed spectra, in that due to the limited spectral resolution of the conventional windows, accurate determination of the monitor peak width and energy was not possible.

These and other disadvantages of the prior art are overcome by the well logging method and apparatus of the present invention.

SUMMARY OF THE INVENTION

In a preferred embodiment of the present invention, a logging tool is provided having a short space detector which may be a geiger tube or photomuliplier tube and a long space detector which preferably is a photomultiplier tube. A logging source such as a two Curie Cesium source is provided for introduction of gamma rays into the formation at borehole elevations of interest. A one micro Curie monitor source such as cesium is also provided adjacent the long space detector.

The tool is further provided with appropriate line driver circuits for each long and short space detector which will condition pulses generated by the long and short space detectors corresponding to gamma rays incident thereupon for delivery on corresponding logging cable conductors to the surface. In an alternate embodiment a pulse height digitizer is provided in the tool for the long space detector which converts the pulse amplitudes of the pulses from the detector into digital form for transmission to the surface by means of an appropriate pulse code modulation telemetry circuit in the tool.

In either embodiment, amplitude signals are available on the surface for analysis corresponding to the amplitude of each pulse generated by the long space detector. Each amplitude will further correspond to the energy level of the gamma ray within at least a 60-660 Kev range impinging on the detector from the formation which caused the pulse in the detector. These amplitude signals are either in analog form as the actual line-conditioned pulses, or, as hereinbefore described, are in digital form after having been thus digitized downhole for transmission to the surface.

In the embodiment wherein the long space detector pulses are sent uphole in analog form, a meter is provided for counting short space pulses delivered to the surface and for developing a count rate corresponding to the rate at which gamma rays are incident upon the short space detector, this digitized count rate being thence delivered to a computer for processing. For the long space detector pulses, the peak of each pulse is detected, held, and thence converted to digital form in an appropriate A-to-D converter. A plurality of energy windows or bins are provided in a buffer. Each bin corresponds to a different 10 Kev energy range between 60–660 Kev and a correlative range of digitized long space pulse amplitudes. The pulses are cumulated in their respective bins and thence delivered to the computer for processing.

In the embodiment wherein the pulses from the long space detector are first digitized in the tool prior to being transmitted uphole by appropriate PCM circuitry, the detector is provided with a pulse height digitizer comprising a peak detector, a sample and hold circuit, and an analog to digital conversion means whereby the amplitudes of the pulses from the detector are digitized. This digitized data from the long space detector is then accumulated in a buffer, in like manner to that just described, formed into PCM frames, and transmitted to the surface in multiplexed form by an appropriate PCM transmitter-receiver system. The short space detector is provided with a count rate meter which delivers a digitized rate to the PCM system for transmission to the surface. The associated PCM receiver uphole delivers the received PCM frames to a demultiplexer which separates the digitized pulse count rate data into that of the long and short space detectors, respectively. This data is thence delivered to a computer for processing.

For a given depth interval, stored at the surface there will thus be a short space count rate, as well as a long space count rate for each 10 Kev interval within the 60–540 Kev range and about the monitor peak of 660 Kev. A computerized process will perform the functions which follow. From a modeling of formations, the interrelationships are developed between the photoelectric effect $P_e$, density $\rho$, and the soft-to-hard ratio S/H which are separated into first, second, and third functions $f(S/H, \rho)$, $g(\rho, P_e)$ and $h(P_e)$. The quotient of the average count rate between the long space regions of 60–100 Kev and 200–540 Kev forms a first soft-to-hard ratio, x. From the first function and this x value, an initial $P_e$ value is obtained, y. From this y value and the third function the $h(P_e)$ value of z is found. This value is utilized to modify the average count rates in the 100–140 and 140–200 Kev long space regions to remove the effect of $P_e$ on the subsequent determination of $\rho$. An average long space count rate will then be selected from between three ranges, 100–540, 140–540, and 200–540 Kev, utilizing the count rates just modified by $h(P_e)$, the particular range being selected as a function of the prior soft-to-hard ratio x.

Utilizing this long space count rate as well as the stored short space count rate and the conventional rib spine equations, a density value r and mudcake correction d are calculated. The second function and this value r for density are thence utilized to obtain a next S/H ratio x'. From this new S/H ratio value and the first function, a next $P_e$ value y' is obtained.

The process is then continued in a perturbative loop whereby there results, through each perturbation, a new S/H, $P_e$, modified count rate in 100–200 Kev range, and new $\rho$. After each perturbation, a check is made to determine if either three iterations have been completed or the change in density has become less than a predetermined value. In either case, the process is terminated, and a new set of long space and short space data derived at a different borehole elevation and the process repeated.

Prior to generation of such new data at a next borehole increment, the processing determines whether a preselected period of time has elapsed since prior detection of the monitor peak in the spectrum transmitted uphole. If such time has not elapsed, the tool will be moved to the next borehole elevation and new data will be derived. However, if the predetermined time period has elapsed, it becomes more probable that circuitry including the gamma rays detector and associated high voltage supplies and the like have drifted requiring redetermination of the location of the cesium monitor peak from which count rates of gamma rays at other energy levels are correlated.

Accordingly, a conventional peak detection search routine is entered to determine the cesium monitor peak from the count rate energy spectrum accumulated from data over the previous minute. The channel location from the A-D converter of this peak is compared to that of the previous determination of the cesium monitor peak, and if identical, no adjustments are made to the system. However, in the alternative, if it has been determined that the apparent cesium monitor peak channel number or location has shifted, an appropriate gain control signal is generated as a function of the loop characteristics and delivered downhole. This gain control signal is thereafter utilized to bring the observed monitor peak location back to its original observed channel number or value, either by adjusting the gain of a software amplifier contained in the loop and/or the magnitude of the high voltage supply which powers the gamma ray detector carried by the tool. Upon such loop gain adjustment, the tool is moved to the next depth increment and the process continued whereby additional data is collected.

Accordingly, it is a feature of the present invention to provide an improved well logging method and apparatus of the radioactivity type.

It is another feature of the invention to provide an improved well logging method and apparatus for measuring formation lithology and density.

Still another feature is to deliver to the surface the entire energy spectrum produced from a subsurface detector by gamma rays from the formation incident thereupon substantially within the energy region of 60–540 Kev.

Yet another feature is to determine more accurately at the surface the energy spectrum and peak of a gamma ray monitor source disposed within the logging tool.

Another feature of the present invention is to provide for improved accuracy in determination of gamma ray detector resolution in a subsurface radioactivity well logging tool.

A further feature is to provide for more accurate correlation between energy levels and measured voltage spectra from a radioactivity well logging tool.

Yet a further feature of the present invention is to adjust the amplitude of a high voltage supply to a photomultiplier tube detector in functional relation to an observed energy peak location of a monitor source in a gamma ray spectrum.

Still another feature of the present invention is to adjust the gain of a computerized software gamma ray amplitude amplifier in functional relation to said observed location of a gamma ray monitor energy peak in a measured gamma ray spectrum generated from a subsurface earth formation location.

BRIEF DESCRIPTION OF THE DRAWINGS

These and other objects and advantages of the present invention are hereinafter set forth and explained in greater detail with reference to the drawings, wherein.

DESCRIPTION OF THE PREFERRED EMBODIMENT

Figure 1:
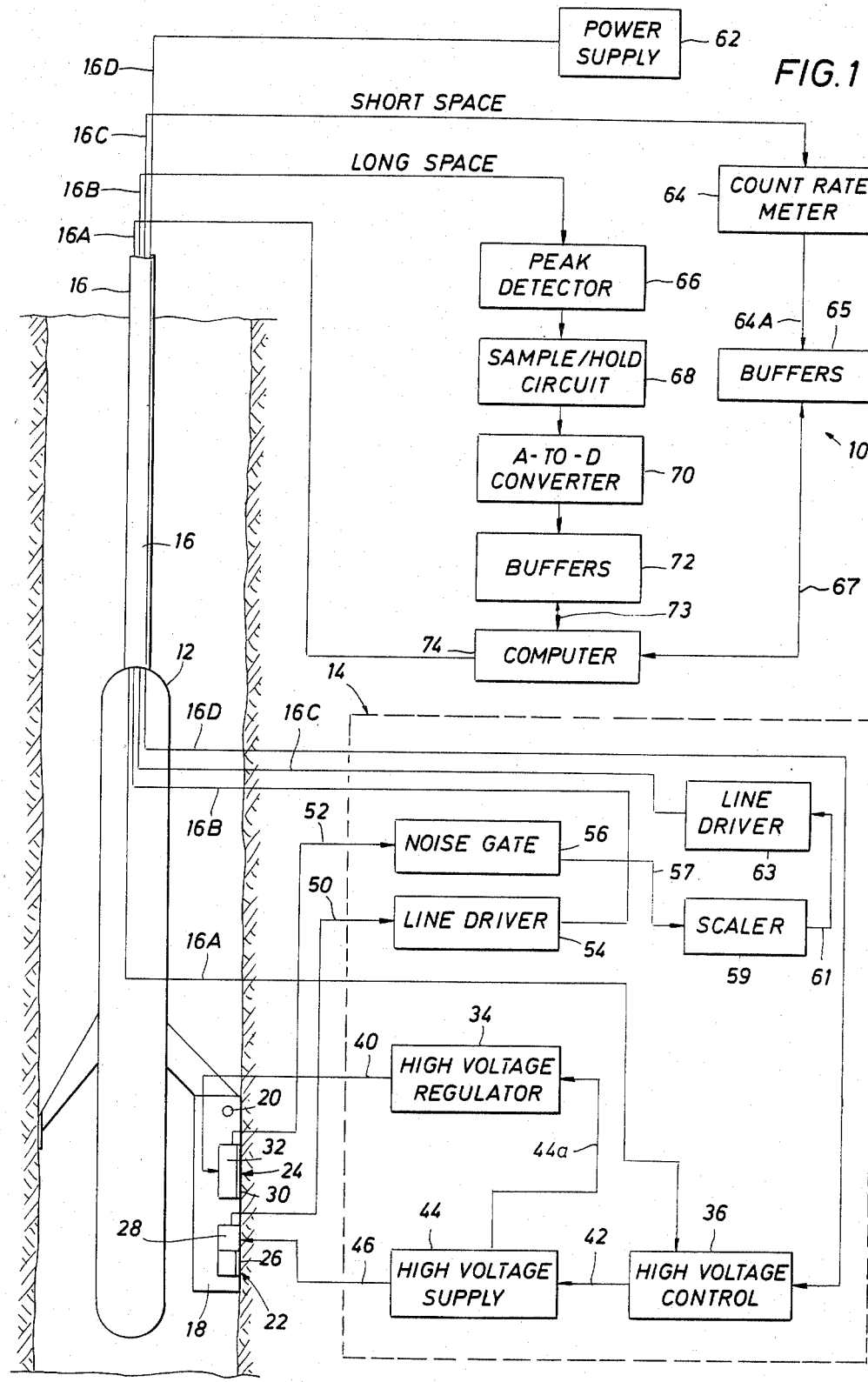
FIG. 1 is a schematic diagram of a typical apparatus for practicing the invention showing the electrical circuits associated therewith in block diagram form.

Referring first to FIG. 1, there will be seen a schematic and functional block diagram depiction of the apparatus of the present invention comprised generally of a surface system 10 interconnected by means of a conventional logging cable 16 to a subsurface well logging sonde or tool 12 containing various downhole electronics 14. While the electronics 14 systems are shown disposed externally of the tool 12, this is only for purposes of clarity and it will be understood that such circuitry may be appropriately housed within the tool 12 itself.

Referring more particularly now to the downhole apparatus, in accordance with the general principles of conventional gamma ray logging known in the art, it is desirable to introduce gamma rays into formations of interest and to thereafter detect by means of a suitable logging tool the energy levels of gamma rays incident thereupon from the formation. It will be recalled that gamma rays in the formation are subjected to photoelectric effect and Compton scattering mechanisms which are, in turn, functionally related to formation characteristics such as lithology and density. Thus, the resulting energy spectrum of the detected gamma rays will contain valuable information regarding these characteristics. Accordingly, it is desirable to provide tool 12 with means for injecting such gamma rays into the formation and for detecting the gamma rays returning from the formation.

Thus, still referring to FIG. 1, disposed within a conventional pressure housing 18, there may be seen a gamma ray logging source 20 which may, for example, be comprised of a two Curie cesium source which will introduce gamma rays having an energy of 660 Kev into the formation at a borehole elevation of interest.

For purposes of detecting gamma rays returning from the formation as hereinbefore described, and with further reference to the housing 18 of FIG. 1, there may be seen disposed therein generally a long space detector assembly 22 having a beryllium window 26 and a photomultiplier tube assembly 28 well known in the art. Similarly, there will also be seen carried by the housing 18 in a general schematic depiction, a short space detector assembly 24 including a cadmium filter 30 and a geiger tube or photomultiplier tube assembly 32 also known in the art.

When gamma rays returning from the formation pass through filter window 26 or 30 and strike the respective photomultiplier tube assembly 28 or assembly 32, each such gamma ray will cause the respective assembly 28 or 32 to produce a voltage pulse, the amplitude of which is proportional to the energy of the particular gamma ray. These voltage pulses will then be delivered from their respective assemblies 28 or 32 on respective output lines 50 and 52 to respective line driver circuits 54 or 63. The purpose of these circuits is to amplify the pulses and provide impedance matching whereby the resulting pulses may be delivered to the surface on respective lines 16b and 16c of a conventional logging cable 16 for processing in a manner to be hereinafter described in more detail.

The short space assembly 32 is further provided with a suitable noise gate 56 disposed between the assembly and driver 63 for gating out signals from the assembly falling below a preselected noise level. The output 57 of gate 56 is routed to an appropriate scaler 59 which will transfer one pulse on output 61 to driver 63 for delivery to the surface for each predetermined multiple of pulses received by the scaler 59.

In accordance with conventional operation of gamma ray detectors such as geiger tubes and photomultiplier tubes, it is necessary to provide such detectors with a source of high voltage. Accordingly, still referring to the downhole portion of FIG. 1, power will be developed at the surface from an appropriate power supply 62 which is delivered on logging cable 16d to the subsurface electronics and, more particularly, to a high voltage control circuit 36. A high voltage 16a generated by the computer 74 at the surface will also be delivered downhole on logging conductor 16a of logging cable 16 to the control circuit 36. In response to this control signal 16a the power delivered on conductor 16d will be regulated so as to develop a controlled high voltage supply which is delivered on line 42 to an appropriate high voltage supply circuit 44. This supply circuit 44 will adjust and filter the high voltage 42 so as to be at a level appropriate for delivery to the detector assembly 22 on high voltage supply output 46.

It will further be noted that the high voltage is further delivered on line 44a to an appropriate high voltage regulator 34, the purpose of which is to regulate this output high voltage 44 at a level appropriate for driving the detector assembly 24. Thus, in like manner to high voltage supply output 46, an appropriate high voltage supply output 40 is provided for the high voltage regulator 34 for delivery of the regulated high voltage supply to the detector assembly 24.

The uphole or surface portion of the apparatus of the present invention depicted in FIG. 1 will now be described in greater detail. First, with respect to the short space detector assembly 24, it is conventional to derive a count rate of gamma rays from the formation incident upon the short space detector 32 having energies within the approximate range of 40 to 400 Kev. A count rate meter 64 is thus provided which receives and counts per unit of time the scaled pulses delivered from short space detector assembly 24 on cable conductor 16c. The meter 64 will thence deliver a digitized count rate of these pulses on output 64a to appropriate buffers 65.

Regarding the output of long space detector assembly 22, it will be recalled that the energy spectrum of gamma rays from the formation incident upon the assembly within the energy range of 60–540 Kev contain a great deal of information regarding characteristics of the formation such as lithology and density. It was thus the practice of the prior art to provide one or more energy window discriminator circuits downhole. The purpose of these circuits was to route pulses within predetermined energy bands to respective counters so as to develop count rates for gamma rays within each energy band for delivery to the surface.

Not only was this approach fraught with the problems of accuracy of the window circuitry which was disposed downhole and subject to drift, but, additionally, due to the need for providing circuitry for each such discriminator the practical number of such discriminators and resulting energy bands and associated energy band count rates were of necessity limited to, in some instances, as few as two. Moreover, there was no provision for convenient selective adjustment of either the number or width of such windows. Additionally, due to the grouping of gamma ray pulses of varying energies into a few relatively large discrete energy bands for counting prior to transmission to the surface, the overall shape of the energy spectrum of the gamma rays incident upon the detector assembly 22 was thus forever lost as well as the valuable information contained therein.

Accordingly, it is within the scope of the present invention to deliver to the surface the actual pulse amplitudes of each pulse from the detector assembly 28 for purposes of more accurately constructing the energy spectrum of the gamma rays incident upon the assembly 22. Thus, referring to the upper portion of FIG. 1, it will be noted that the output 50 of the detector assembly 22, after conditioning by line driver 54, is delivered on logging conductor 16b to conventional pulse height digitizer circuitry. This circuitry is comprised of peak detector 66, sample/hold circuit 68, and analog-to-digital converter 70 for converting amplitude of these pulses, each corresponding to a correlative gamma ray energy level, to a digitized form. The output of A-to-D converter 70 may then be delivered to suitable buffers 72 which will count these digitized pulses occurring in any desired number and width of energy bands so as to develop count rates for each such desired energy window or band.

It will be appreciated that it may be desirable to derive an average gamma ray count rate over a preselected interval of time, such as one minute, for calibration purposes. It may also be desirable to obtain an average count rate over the period of time during which the sonde 12 is disposed at a preselected depth, and to obtain new count rates each time the sonde 12 is relocated to a different elevation. Thus computer 74 may be provided with input-output buses 67 and 73 whereby computer 74 may selectively retrieve from respective buffers 65 and 72 the gamma count rate just described as desired, whether they be delivered over a preselected time interval or depth interval.

It is specifically contemplated by the present invention to effect delivery to the surface of indications of the amplitude of each pulse incident upon the detector assembly 22. In this manner, the entire energy spectrum of such gamma rays is available at the surface rather than merely count rates for a limited number of energy bands provided by window discriminators contained within the logging tool 12. It may therefore be desirable to provide such pulse amplitude information at the surface not in analog form as depicted in FIG. 1, but rather in the form of pre-digitized pulse amplitude information which is digitized downhole prior to delivery to the surface.

Figure 2:
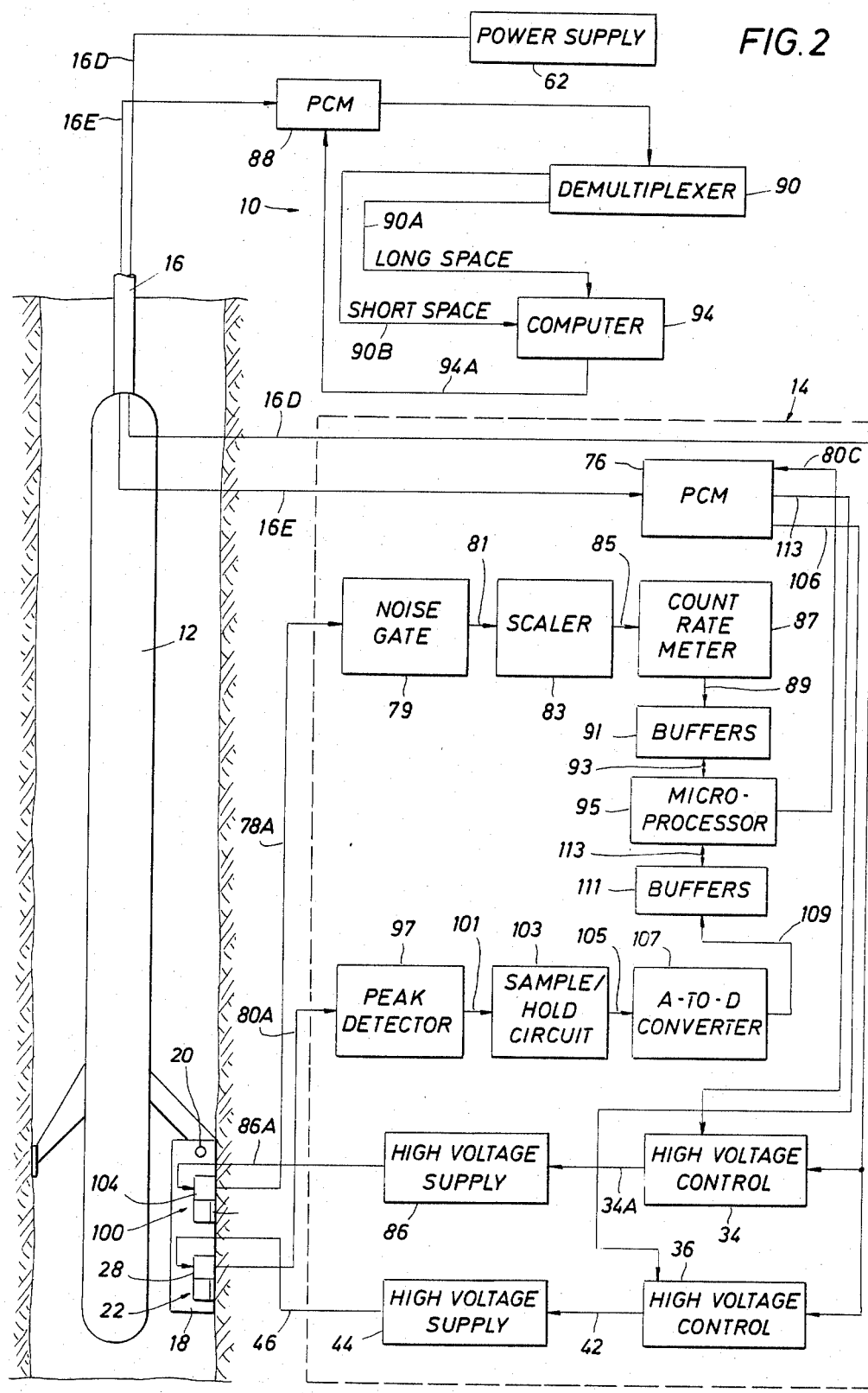
FIG. 2 is a schematic diagram of another embodiment of a typical apparatus for practicing the invention, again showing the electrical circuits associated therewith in block diagram form.

Thus, referring to FIG. 2, in another embodiment of the present invention, pulse height digitizer circuits are provided within tool 12 for performing this function. In some cases, due to increased sensitivity generally associated with photomultiplier tubes rather than geiger tubes, and for other such reasons, it is desirable to replace the short space detector assembly 24 of FIG. 1 with a photomultiplier tube. Thus, in FIG. 2 it will be noted that the geiger assembly has been replaced with a photomultiplier tube assembly 100 which also includes, in like manner to that of assembly 22 of FIG. 1, a photomultiplier tube and crystal assembly 104, and, if relatively low energy photons are also being detected, a beryllium window 102. Output 80a from the long space photomultiplier assembly 22 is delivered to a peak detector 97 which detects the maximum amplitude of the pulses on output 80a. This amplitude is delivered as output 101 to a sample/hold circuit 103, whose output 105, in turn, is delivered to an A-D converter 107 for conversion to digital form.

These digitized pulse amplitudes are thence delivered as outputs 109 to buffers 111. They are accummulated therein and counted in a plurality of narrow energy windows or bins separated by amplitudes corresponding to, for example, energy differences of 10 Kev between an energy range of 60–540 Kev.

As in the case of the embodiment of FIG. 1, it may be desirable to obtain average count rates over a preselected calibration time interval of, say, one minute, or, alternatively, to obtain such count rates for data derived at preselected borehole elevations. Thus, a microprocessor 95 is further provided having an input/output bus 113. Count rates in the various energy windows of buffers 111 may be retrieved under command of microprocessor 95 on bus 113, either on a timed basis or in response to a "depth interrupt" signal from the surface which indicates movement of sonde 12 to a next depth.

Output 78a from short space photomultiplier tube detector assembly 100 may, in like manner to that of output 80a, be routed through a peak detector, sample/hold circuit, A-D converter, and buffers to a microprocessor 95 whereby more detailed spectral information may be derived from the short space data. However, in the embodiment of FIG. 2, this short space output 80a is, in like manner to that of FIG. 1, routed through a noise gate 79, whose output 81 is then scaled by scaler 83. The scaled pulse output 85 is thence delivered to a count rate meter 87 whose output 89 is delivered to buffers 91. In this case, since the entire short space spectra is not being detected, however, the beryllium window is not essential.

As with the case of buffers 111, it may be desired to obtain count rate data over a time interval or depth location. Thus, input/output bus 93 is provided so as to permit delivery of count rate data from buffers 91 in response to microprocessor 95 on either a time or depth basis to the microprocessor 95.

These digitized count rate outputs 78c and 80c are thence delivered to an appropriate downhole communication or telemetry circuit such as a pulse code modulated transmitter-receiver 76 well known in the art. After forming appropriate frames of digital data comprised of the digitized pulse counts stored in buffers 91 and 111, PCM 76 will transmit these frames of data on logging conductor cable 16e to the surface for purposes to be hereinafter described.

In the alternative embodiment presently being described with respect to FIG. 2, it will be noted that, in like manner to the long space detector 22, means may be provided for adjusting the high voltage supply to the short space assembly 100 for proper operation. Thus, in like manner to the high voltage control 36 a high voltage control circuit 34 may be provided for receiving the high voltage supply output 16d from power supply 62. This control circuit 86 adjusts output 34a in accordance with control signal 113 prior to delivery to high voltage supply circuit 86. This circuit regulates and filters the supply voltage prior to delivery on line 86a to the photomultiplier tube 104 of short space detector 100.

It will be recalled that it was specifically contemplated that the high voltage control of the long space and short space detectors may be controlled from the surface, as with the high voltage control line 16a depicted in FIG. 1. Accordingly, the data included in PCM frames being transmitted from a surface PCM transmitter-receiver 88 may include amplitude control signals which may be decoded by the transmitter-receiver 76 and delivered as control signals 106 and 113 to respective voltage control circuits 44 and 86.

Referring now to the uphole portion of the apparatus of the present invention depicted in FIG. 2, the hereinbefore described PCM data frames after being received by the receiver-transmitter 88 are delivered to a demultiplexer 90 which will separate the digitized long space data from the short space data. This long space and short space count rate data is then delivered, respectively, on demultiplexer outputs 90a and 90b to computer 94 for processing in a manner to be described.

It will be noted that a computer output 94a has been shown delivered to the PCM transmitter-receiver 88. In a preferred embodiment, this output serves the purpose of controlling the high voltage supplies delivered to the detector assemblies 22 and 100 disposed in the tool 12. Such control signals are derived from processing of the data delivered to computer 94 on lines 90a and 90b in a manner to be described.

Thus, the control signal 94a is delivered to the transmitter-receiver 88, whereupon at appropriate times the control signal is delivered downhole on the logging cable 16 conductor 16e to the downhole PCM transmitter-receiver 76. The transmitter-receiver 76 thereafter decodes this control signal and delivers the resulting decoded control signals 106 and 113 to respective high voltage control circuits 44 and 86. These circuits, it will be recalled, will adjust the corresponding high voltage outputs 42 and 34a, respectively, so as to deliver adjusted high voltage supply outputs 46 and 86a to the respective detector assemblies 22 and 100, the magnitude of such supply voltages thus being controlled from the surface by computer 94 and its control output 94a.

Figure 5A:
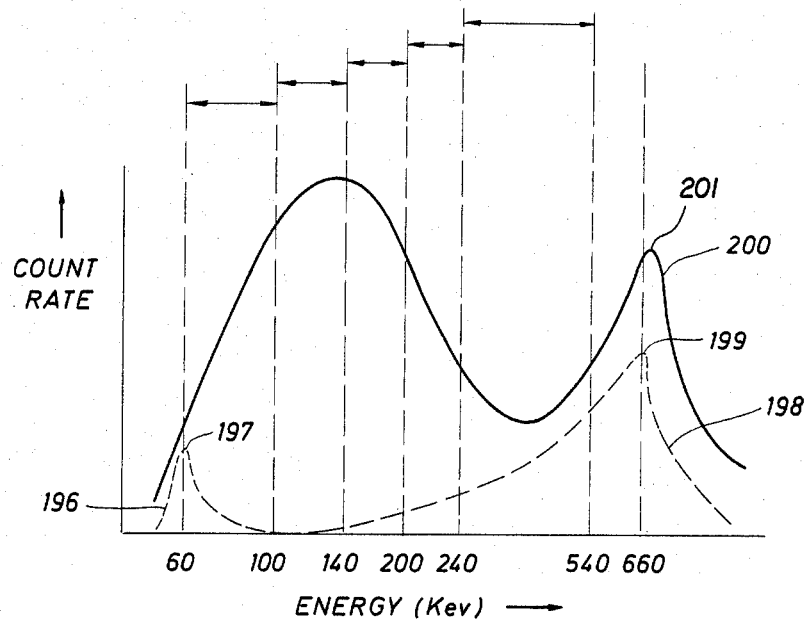
FIG. 5A is a schematic representation of various energy spectra associated with the present invention.

From the previous discussion it will be recalled that the energy spectrum of gamma rays exiting from a formation of interest which are incident upon a detector assembly 22 or 24, for example, contains extremely valuable information regarding the characteristics formation of such as density and lithology. Referring now to FIG. 5A there will be seen depicted a schematic illustration of what such a typical energy spectrum 200 might look like. It will further be recalled from previous discussion that not only does the overall relative shape of the spectrum 200 contain useful information, but that it is particularly desirable to correlate or translate a voltage spectrum from the detector assemblies into an energy spectrum whereby count rates may be correlated to actual energy levels of gamma rays to which they correspond.

Thus, as previously described, it is desirable to provide a source of gamma rays adjacent the detector assembly 22 or 24 having a known energy spectrum 198 centered about a peak 199, one appropriate source being for example, a one micro Curie cesium source centered about 660 Kev. It will be noted that the gamma ray detectors will be generating analog pulses corresponding to gamma rays incident thereupon, such pulses having amplitudes corresponding to the energy of their respective gamma rays. Gamma rays incident upon the detector from the formation are of unknown energies which are desired to be known due to their information content. By superimposing upon the detector not only gamma rays from the formation but gamma rays having the known energy peak 199 from the monitor source, the resulting composite energy spectrum from the detector (comprised of gamma rays not only from the formation but from the monitor source as well) will exhibit a characteristic peak 201 due to the concentration of gamma rays from the monitor source at the known peak 199 of 660 Kev. Accordingly, detection of this peak in the composite energy spectrum 200 will locate an absolute energy value on the spectrum from which actual energy values from other points on the spectrum 200 may be determined.

Thus, still referring to FIG. 5A it will be noted that the composite energy spectrum 200 will be comprised of an energy spectrum of gamma rays from the formation as well as the energy spectrum 198 from the internal monitor source (not shown) which will be superimposed upon the formation energy spectrum. The resulting composite spectrum 200 will thus exhibit the 660 Kev peak 199 from the monitor source spectrum 198, from which other absolute energy values on the energy spectrum 200 may be extrapolated. The relationship between the analog voltage pulse output of a photomultiplier tube and the corresponding energy level of the gamma ray which caused the pulse typically approximates a linear relationship of the form $y = mx + b$. Accordingly, in order to translate any pulse amplitude into a corresponding energy level it is necessary to solve this equation and thus have initially two known points on the function in order to obtain the slope, m, and intercept, b.

Accordingly, in the initial calibration of the tool 12 of the subject invention it is necessary to have one additional measurement of the detector at another known energy level in addition to that of the cesium peak exhibited by spectrum 198. It is thus conventional, prior to a logging operation, to also temporarily dispose adjacent the detector another monitor source such as americium having a known energy spectrum 196 and peak 197 at 60 Kev, such that from these two known energy peaks and corresponding measured count rates from the detector, any other measured pulse amplitude and related count rate can thus be correlated to an actual energy level of the gamma ray.

It will be noted in passing, that the spectrum 198 from the internal cesium monitor source will be superimposed as part of the resulting composite energy spectrum 200 generated by the detector during a logging operation. Thus, spectrum 198 must be subtracted out from composite logging spectrum 200 in order to yield the desired energy spectrum corresponding to gamma rays from the formation alone.

However, the americium spectrum 196 and correlative peak 197 will not be superimposed on the composite spectrum 200 nor will it have to be subtracted out in that it is only disposed adjacent the detector temporarily for calibration purposes prior to logging and thereafter removed. Thus, while the cesium peak 199 of the internal monitor source from the monitor spectrum 198 may be seen clearly as a peak in the composite spectrum 200, and while this monitor peak will be monitored throughout the logging process in order to track a known energy level on the spectrum 200, this will not be required for the americium source. Whereas both peaks 197 and 199 were required to obtain m and b as hereinbefore described, thereafter only the slope m will be monitored due to the detector gain variations in that it has been experimentally verified that the intercept b will vary insignificantly.

Figure 3A:
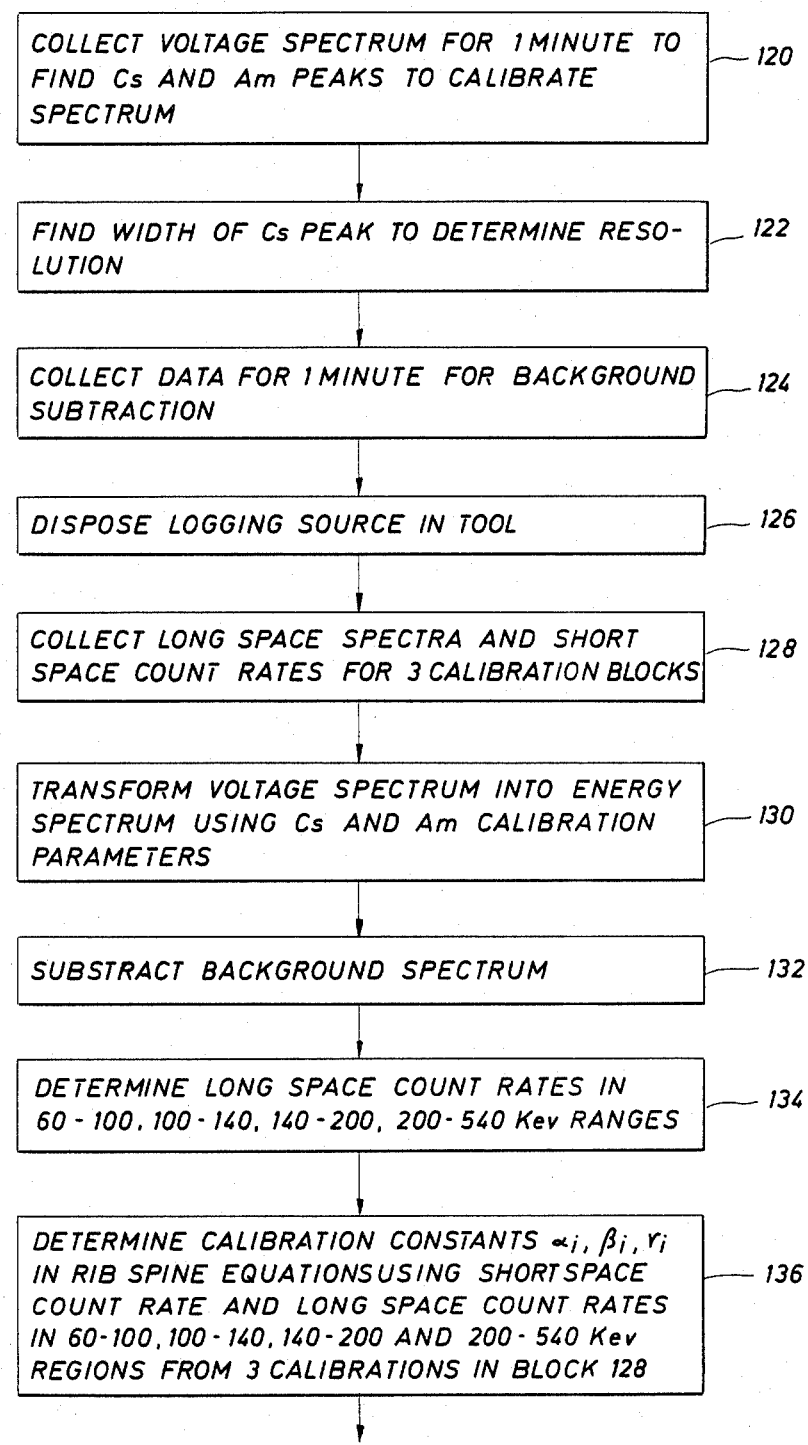
FIGS. 3A-C is a flow chart depicting the processing and control functions implemented by the computers depicted in FIGS. 1 and 2.

With the foregoing in mind, and now referring in particular to FIGS. 3A, B and C, it will be noted that in order for the computer 74 or 94 to analyze the spectrum 200 it is necessary for the detectors to be calibrated prior to the logging operation. In that the calibration procedure is substantially the same regardless of whether the analog pulse outputs are delivered to the surface prior to digitization as in FIG. 1, or in the alternative, are digitized downhole prior to delivery uphole for analysis as depicted in FIG. 2, the procedure will, for simplicity, be described with respect to FIG. 1.

With respect to FIG. 3A, block 120 is first intended to indicate that the aforementioned americium source is disposed, for example, adjacent detector assembly 22 and the resultant pulse outputs from the tube 28 for each gamma ray impinging upon the assembly 24 from the americium source are monitored for one minute and delivered as output 50 to the surface. There they are digitized and counted so as to form spectrum 196 which is stored in the computer 74. From a conventional peak finding routine, the computer 74 will then find the maximum count rate from the spectrum 196 which will thereafter be associated with the known energy peak 197 of the americium peak of the monitor source at approximately 60 Kev.

In like manner, the peak 199 due to the one micro Curie internal cesium source (not shown in FIG. 1) will be determined by locating the peak or highest count rate associated with the cesium source, and the computer 74 will thereafter associate this count rate with the known energy peak 199 of the calibration source at approximately 660 Kev. As hereinbefore described, from these two known points relating count rates to known energy levels, it will be appreciated that as the apparent energy peak of the cesium on the composite spectrum 200 shifts, (which is in reality a voltage peak and which actually corresponds to an invariant energy level of 660 Kev), by monitoring this shift any detector analog voltage pulse or count rate may be correlated to an energy value. It will be recalled that this apparent shifting may be due to, for example, gain variations in the photomultiplier tube.

After determining the calibration points for the cesium and americium, the computer 74 will thereafter determine from the stored spectrum 198 the width of the cesium peak 199 as depicted in block 122. Whereas the actual energy peak of the internal cesium source will be extremely narrow, on the order of a few pico-electron volts, due to the resolution limitations of physical detectors, the observed spectrum will appear to be wider than it actually is. The widening or "smearing" of the observed cesium peak may be shown to be functionally related to the actual peak width by a Gaussian distribution. Thus, the observed width of the cesium peak 199 and the known actual peak width may be used, as depicted in block 122, to permit the computer 74 to determine what the resolution of the particular detector 32 is for purposes that will be later described.

Once the cesium and americium peaks and the detector resolution have been determined, as depicted in blocks 120 and 122, the voltage spectrum 198 attributable to the internal monitor source is collected and digitized for one minute and stored. The spectrum of the internal monitor source, while having a clearly discernable peak 199 which is useful for purposes of translating observed voltage spectra into actual energy values, will also provide gamma rays overlapping into energy levels in the range of interest wherein it is desired to monitor gamma rays coming only from the formation. It will be recalled that it is the energy spectrum of those latter gamma rays which contain the information content regarding formation characteristics which are desired.

However, the observed spectrum from a detector will be a composite (200 of FIG. 5A) of not only the spectrum caused by gamma rays from the formation but those from the internal monitor source impinging directly upon the detector (depicted as 198 of FIG. 5A). Thus, as just described, this spectrum 198 of the monitor source is collected in block 124 in order that it may later be subtracted from the composite spectrum 200 to yield the spectrum of interest from the formation.

Next, as depicted in block 126 of FIG. 3A, the two Curie cesium logging source of gamma rays 20 is then disposed within the pressure housing 18. As further depicted in block 128, long space spectra from the detector assembly 22 and short space count rate from the short space detector assembly 24 are then collected for each of three calibration blocks in a manner known in the art. Typically these blocks may be formed of aluminum and magnesium, the aluminum block giving a value of density of 2.8 g/cm$^3$, and the magnesium blocks having densities of 2.2 and 2.5 g/cm$^3$ with 0.023 g/cc correction. The purpose of this step is to determine the calibration constants of the rib-spine equations to be herein described and also well known in the art.

It will be recalled that analog voltage pulse amplitude spectra generated by detectors 22 and 24, while measured in terms of voltages, can be converted to energy spectra in that from block 120 two calibration parameters from the detectors relating voltages to known energy levels were obtained, namely those of the americium and cesium peaks 197 and 199. Accordingly, in block 130, these various long space spectra from the background measurement at block 124 and the three calibration measurements at block 128 may be converted by computer 74 into energy spectra and stored, as schematically depicted by block 130, in computer 74. Moreover, once the various voltage spectra from measurement of the three calibration blocks and the internal monitor source have been converted to energy spectra, as hereinbefore noted the background spectra 198 attributable to the monitor source may be subtracted from the long space spectra for each calibrator block obtained in block 128. This will yield the spectrum due to the calibration blocks themselves, as schematically indicated by block 132.

In one embodiment, buffers 72 may be set up to cumulate in a series of energy windows or "bins" digital words from A-D converter 70. Each such window will correspond to an energy range of, e.g., 10 Kev, with enough windows being provided to cover the entire range of interest of 60-540 Kev. Each window will further correspond to a correlative digital word range which will vary in accordance with the dynamic range of the particular A-D converter employed.

For example, the first window may correspond to an energy range of 60-70 Kev, and will cumulate or count all digital words appearing on the output of converter 70 within the digital equivalent of 0.6-0.7 volts (corresponding to gamma rays detected within this energy range). The next window may correspond to an energy range of 70-80 Kev, and will count all digital words between 0.7-0.8 volts, and so on. Thus, there will be present per unit of time for each of 48 bins, 48 count rates, each such count rate corresponding to the number of gamma rays detected within the energy range of the particular window.

Still referring to FIG. 3A, the energy spectrum 200 from the long space detector assembly 22 may be conveniently divided into four energy ranges, e.g., 60-100 Kev, 100-140 Kev, 140-200 Kev, and 200-540 Kev, for reasons that will be later described.

As depicted in block 134, the computer 74 may retrieve from buffers 72 each of the count rates for each of the ten Kev ranges, and thus develop an average count rate over the five energy ranges thus described for each of the three calibration block spectra.

Upon determination of such averaged long space count rates in the aforementioned four energy ranges from the count rate spectra stored for each of the three calibrator blocks, calibration constants will then be derived in a manner to be described. The constants will be utilized in conventional rib-spine equations to determine formation density and mudcake correction.

More particularly, it is first known that the following conventional rib-spine equations relate short space and long space count rates to formation density and mudcake thickness:

$$N_s = \beta_s \exp(-\alpha_s \rho + \gamma_s d)$$

$$N_L = \beta_L \exp(-\alpha_L \rho + \gamma_L d) \qquad \text{Equations 1}$$

where,
$N_s$ = short space count rate
$N_L$ = long space count rate
$\rho$ = formation density, and
d = product of mud weight and thickness.

From these equations, for the aforementioned three calibration blocks corresponding to:
aluminum block 1: $\rho = 2.8$, d = 0
magnesium block 2: $\rho = 2.2$, d = 0
magnesium block 3: $\rho = 2.5$, d = 0.23,
it can be shown that the following relations hold for obtaining the six contants in equations 1:

$$\alpha_s = 1.667 * Ln(N_{s(2.8)}/N_{s(2.2)})$$

$$\beta_s = N_{s(2.2)} \exp(2.2\alpha_s)$$

$$\gamma_s = Ln(N_{s(Block\ 3)}/N_{s(2.48)})$$

$$\alpha_L = 1.667 * Ln(N_{L(2.8)}/N_{L(2.2)})$$

$$\beta_L = N_{L(2.2)} \exp(2.2\alpha_L)$$

$$\gamma_L = Ln(N_{L(Block\ 3)}/N_{L(2.48)}) \qquad \text{Equations 2}$$

It will be recalled that from block 124 a long space count rate has been obtained in each of the four energy ranges from each of the three calibrator blocks. Thus, four sets of six constants $\alpha_s$, $\beta_s$, $\gamma_s$, $\alpha_L$, $\beta_L$, $\gamma_L$ may be determined, one for each of the four energy ranges over which the long space count rates were determined from block 134. These calibration constants are thus derived at this point as depicted in block 136.

Once the just described calibration routine of blocks 120-136 of FIG. 3A have been completed, the apparatus of the present invention is thus ready to obtain logging data for formations of interest. Accordingly, the sonde 12 is thence disposed within a borehole at a desired elevation wherein formation characteristics are desired. As shown by block 138 of FIG. 3B, short space count rate from the short space detector assembly 24 and long space count rates in the previously described energy ranges from gamma rays impinging upon the long space detector assembly 22 are thereafter collected at the desired depth as previously described and stored in computer 74 for further processing. Once the data at this depth has been collected, in like manner to the processing step of block 130, the voltage spectra thus obtained are converted into energy spectra as depicted in block 140, again using the cesium and americium calibration parameters as in block 130.

Also, in like manner to block 132 of FIG. 3A, in that the internal cesium monitor source is still present in the sonde 12 for purposes of identifying the cesium peak 200, it will again be necessary to subtract the stored background spectra 198 from the composite spectrum 200 just obtained in order to yield an energy spectrum attributable only to gamma rays from the formation. Accordingly, as shown in block 142, this background spectrum 198 known from the calibration routine in blocks 120-136, and more particularly from the background data obtained in block 124, may be subtracted, as shown in block 142.

Finally, also in like manner to determination of the long space count rates in the aforementioned ranges shown in block 134 for the three calibration blocks, in block 144 the average count rates in these same regions may be determined for the data just collected in block 138 from the formation at the borehole elevation of interest.

It is desirable to obtain a model of logging response or photon spectra expected to be observed over a wide range of formation and mudcake conditions and tool configurations. In this manner, measured spectra may thus be compared to model responses for varying formation and mudcake $\rho$ and $P_e$ conditions to determine the lithology and density of the formation under investigation.

Figure 5B:
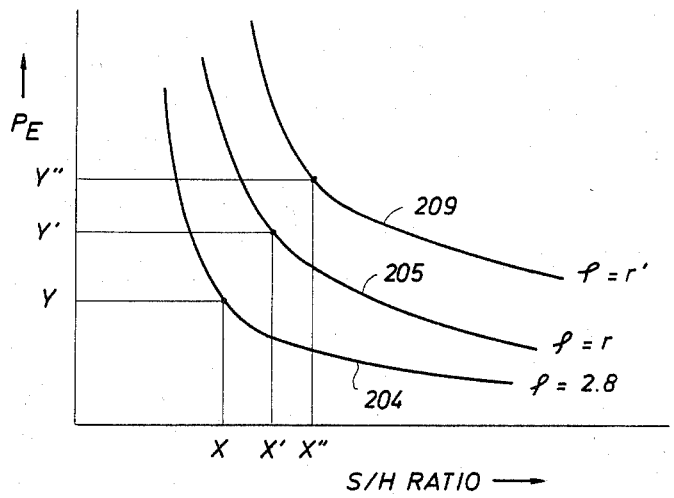
FIGS. 5B-5D are schematic depictions of functional relationships employed in practicing the present invention.
Figure 5C:
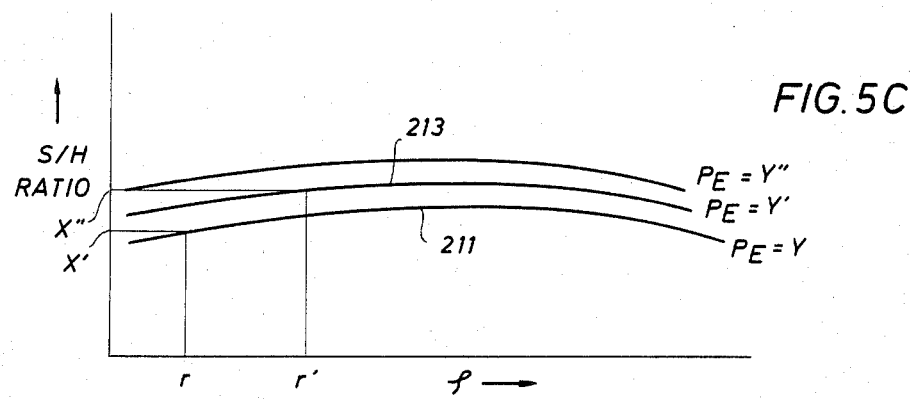

Validity of such a model may, or course, be verified empirically by comparing model response or data fit to test data from known formations or test pits. Furthermore, once model accuracy has been thus established, the model may be used to derive, by running a series of calculations in which various parameters such as $\rho$ and $P_e$ are varied, interrelationships between $P_e$, $\rho$ and S/H, such as these depicted in FIGS. 5B, 5C, and 5D, wherein FIG. 5B is a function of the form $$P_e = a/(S/H) + b$$

and wherein FIG. 5C is a function of the form $$S/H = S/H' \times A^{2.6-\rho}.$$

Figure 3B:
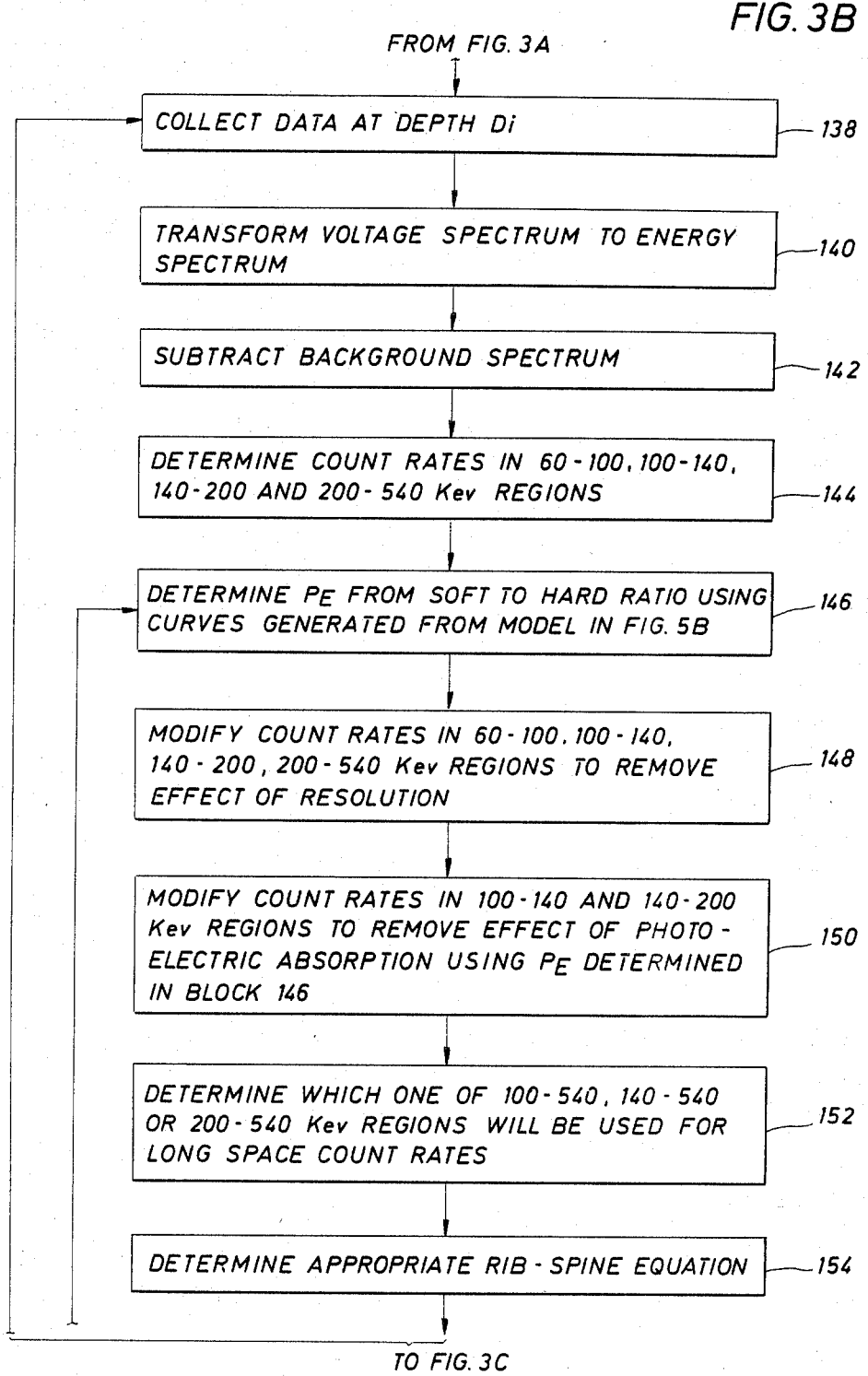
Figure 3C:
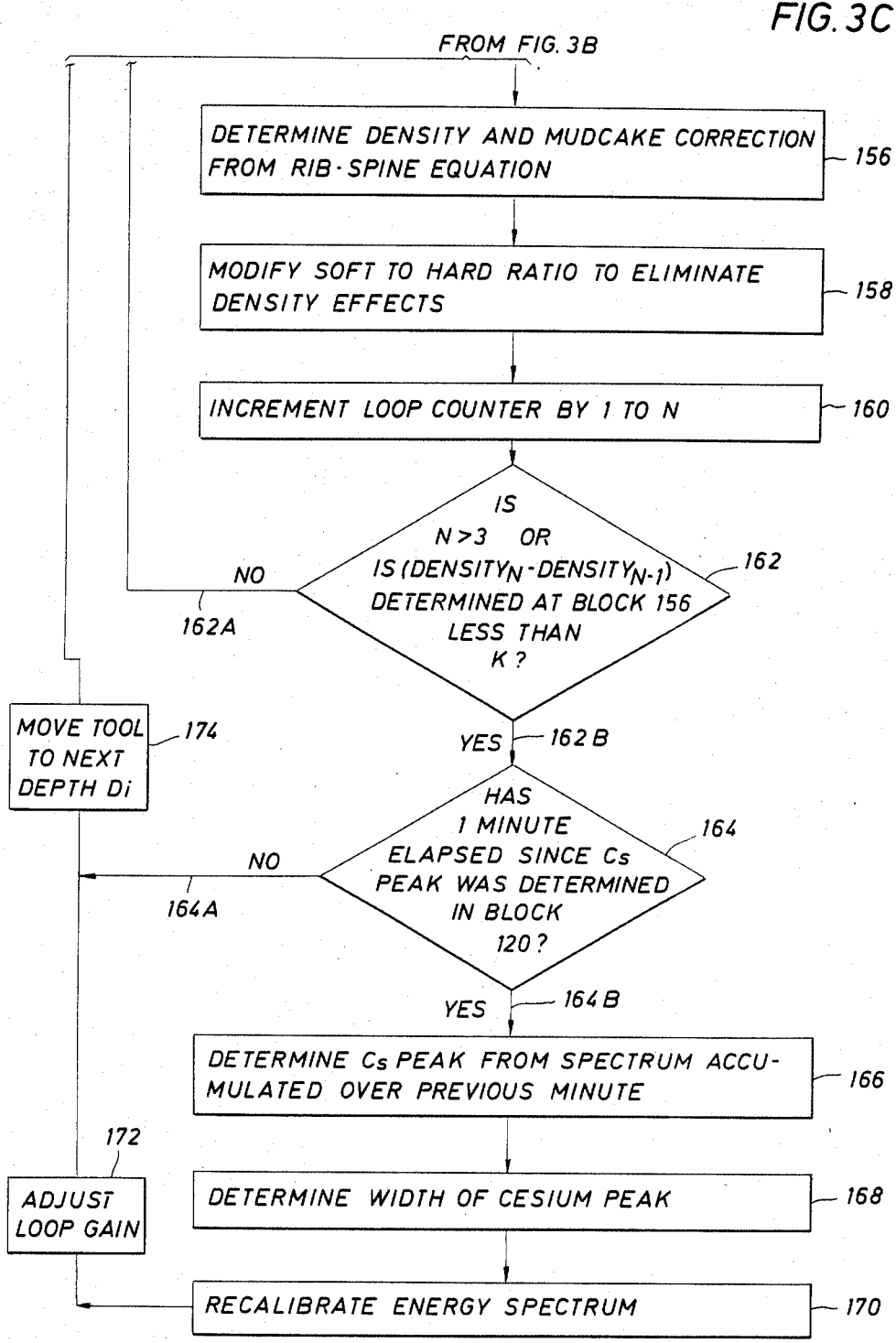

In particular, it will be noted that as a result of such analysis with the model, the spectral response of the tool may be separated into two functions wherein $\rho$ and $P_e$ may be separated out, thus permitting the perturbative process to be further described with respect to FIGS. 3A, 3B, and 3C.

The basic steps will accordingly be hereinafter described with reference to FIG. 4 for constructing one such model and the resulting functional relationships of FIGS. 5B, 5C, and 5D which follow therefrom for use in the processing of FIGS. 3A, 3B, and 3C to determine formation $\rho$ and $P_e$.

Figure 4:
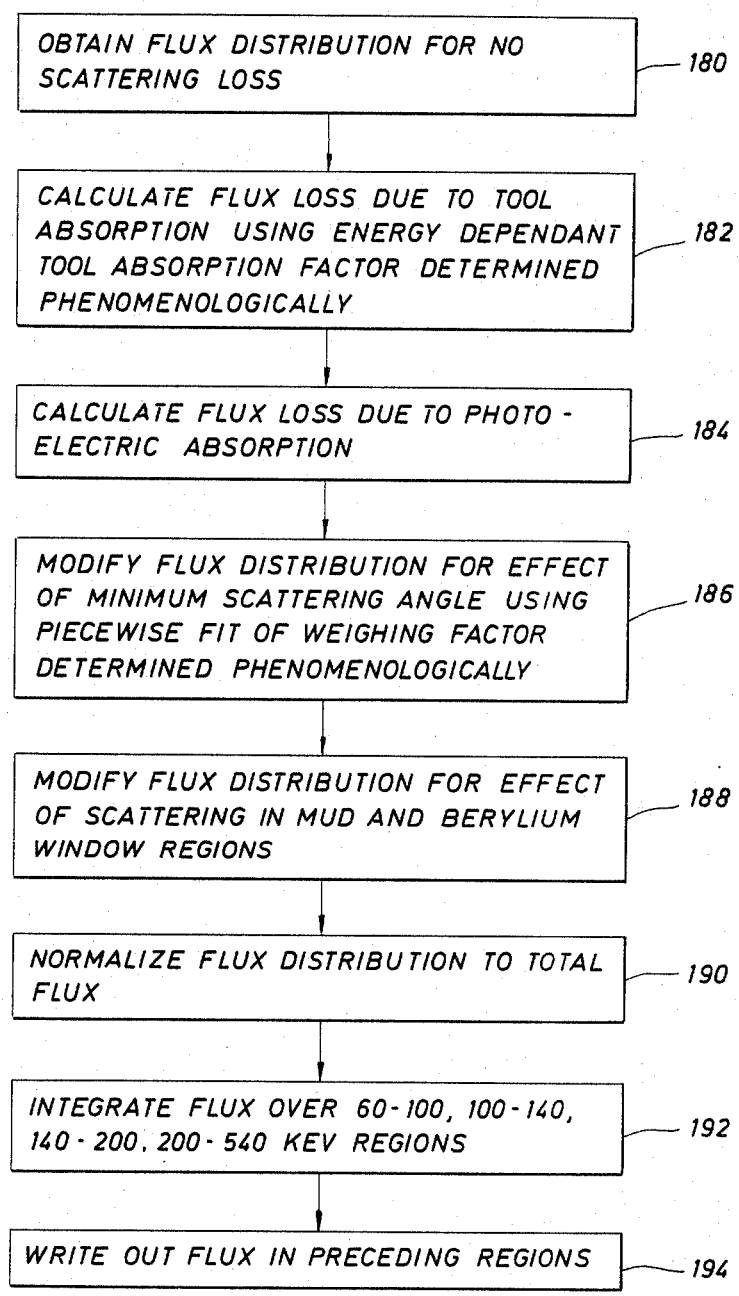
FIG. 4 is a flow diagram depicting the modeling steps performed in arriving at flux distributions utilized in the steps depicted in FIG. 3.
Figure 5D:
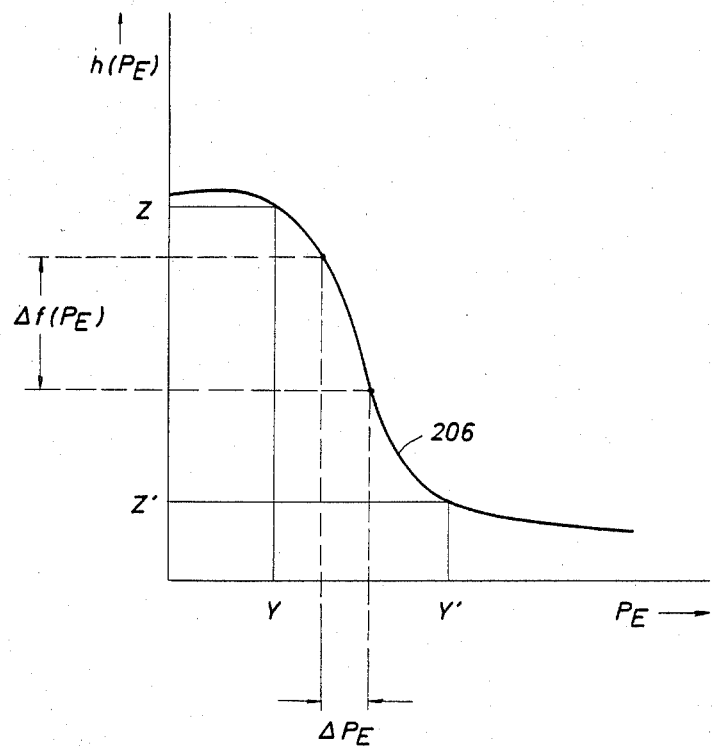

Accordingly, FIG. 4 is intended to depict generally the steps for obtaining a modeled flux distribution for a given logging tool 12 and for deriving the functional relationships of FIGS. 5B, 5C, and 5D.

First, flux distribution will be obtained as depicted in block 180, assuming no scattering losses due to photoelectric absorption of the formation but rather assuming only Compton scattering effects. Such flux distribution is shown in the literature to be of the form $1/E^2$.

It will be appreciated that a certain amount of flux loss may be expected at the detector due to photons colliding with the tool outside the vicinity of the detector. This loss is attributable to photoelectric absorption of these photons by the tool material. In that this tool effect will be the same for a given tool configuration in all formations, an energy-dependent tool absorption factor may be determined from empirical fits to phenomenological data, e.g., measured spectra, from test pits of known composition. This adjustment in the spectrum at the detector may be seen depicted as block 182.

Next, it is expected that in any formation measured spectra will be reduced by a certain degree by photoelectric absorption wherein photons are absorbed by materials in the formation rather than merely experiencing only energy losses due to Compton effects. This $P_e$ effect may be accounted for in the modeling analytically in a manner well known in the art and as indicated in block 184 of FIG. 4.

The logging source 20 is conventionally provided with shielding material to prevent photons from reaching the detector directly and thus avoiding interaction with the formation. It will be recalled that it is this effect on photon spectra resulting from the formation interactions which is desired, in that the resultant spectrum will thus contain information content regarding formation characteristics.

Accordingly, due to the aforementioned shielding, photons must scatter a minimum angle determined by the geometry of the source in order to reach the detector. Thus, the flux distribution must be modified to account for this dependency on the minimum scattering angle, effectively eliminating the more direct photon paths from the source to detector.

This effect will be controlled by the source geometry such as slot size and may be compensated for phenomenonologically given a known source geometry. Accordingly, a weighing factor may be derived from a piece-wise linear fit of the form $W = A \times (e-b)^c$ wherein A, b, and c, are determined by a fit of the model—generated spectra to actual test pit data. At each energy range of interest, the weighing function is thus calculated and utilized to adjust the count rate at that energy as indicated by block 186.

It is also to be expected that photons may next be affected by interaction with the mudcake and beryllium window regions with the resultant effect upon flux distribution. Specifically, for example, due to the relatively high photoelectric cross-section of barite mud and the steel surrounding a typical window, it is expected that a fraction of the photons traveling from the formation in the direction of the detector will experience photoelectric absorption. Thus, the fraction of photons from the formation that interact and still travel in the direction of the detector, may be determined from an empirical fit of test data, and the likelihood of interaction of such surviving photons interacting in the mudcake and window regions may be determined analytically. Compensation for such mudcake and window effects may thus be seen indicated as block 188 of FIG. 4.

Finally, once the flux distribution has thus been obtained in a manner just described, the distribution will be normalized in block 190 so as to conform with the rib-spine calibration and test pit data. It will then be integrated, as indicated by block 192 over the energy regions of interest with respect to FIGS. 3A–3C, and printed out as the desired flux distribution or count rate for the various energy regions as shown in block 194.

Once the modeling of FIG. 4 has been effected, it may thereafter be checked for accuracy by comparing spectral test data from a known formation with the expected or calculated flux of block 194 by substituting the appropriate parameters such as detector geometry, mud and formation $\rho$ and $P_e$. Moreover, once the model has thus been verified, the functional interrelationship between $\rho$, $P_e$, and S/H may be analyzed by changing such parameters at will. As aforementioned, such analysis accordingly results in a determination that the effect of $P_e$ and $\rho$ on count rate for the energy spectra of interest may be functionally separated out as depicted in FIGS. 5B–5D and that such functional separation may be utilized in the perturbative process to be further described hereinafter for arriving at the actual lithology and density parameter values for the formation under investigation.

Returning now to block 146 of FIG. 3B, it will be recalled that long space and short space count rates have been derived and stored in the computer 74 for a preselected depth interval, that this data has been transformed into energy spectra and the background from the internal monitor source subtracted. Thereafter, average count rates in the four energy regions of interest were derived (60–100 Kev, 100–140 Kev, 140–200 Kev, and 200–540 Kev). From the count rates corresponding to 60–100 Kev and 200–540 Kev a first soft-to-hard ratio "x" may be thus derived which may further then be utilized in the relationship depicted in FIG. 5B and stored in an appropriate computer subroutine so as to enable determination of a first $P_e$ value of "y", as shown in block 146. Initially, the standard density value of 2.8 g/cm³ is utilized and thus curve 204.

As is well known in the art, due to physical limitations on the detector assemblies 22 and 24, they will have limited resolutions which will have the effect of spreading out or smearing any measured energy spectrum by a Gaussian distribution. However, in that the width of the cesium peak has been determined in block 122 and may be compared to its known width, the resolution of the detector 22 is thus known. Accordingly, the count rates determined at any depth Di in block 144 may be modified to compensate for this known resolution of the detector, as shown in block 148.

From the foregoing, it will be recalled that count rates in the 100-200 Kev region will be affected by $P_e$. It will further be noted that this effect of $P_e$ on count rates in this region may be removed by utilizing count rate compensation factors derived from the spectra model and depicted as $H(P_e)$ in FIG. 5D.

Thus, as shown in FIG. 5D, the first $P_e$ value of y determined in block 146 from the first S/H ratio value x may be utilized to obtain count rate correction factors $H(P_e)$ such as "z". These z factors will be select count rates from one of the regions therein described as a function of these conditions, as shown in block 152 and will utilize this long space count rate in later calculations.

Utilizing the hereinabove noted conventional rib-spine equations 1, it can be further demonstrated that $$\rho = \frac{\gamma_L \text{Ln}(N_s \beta_s) - \gamma_s \text{Ln}(N_L/\beta_L)}{\alpha_L \gamma_s - \alpha_s \gamma_L} \qquad \text{Equation 3}$$

$$d = \rho - \text{Ln}(\beta_L/N_L)\alpha_L$$

It will be noted that in block 136 that the six calibration constants of equation 3 were determined utilizing the data collected in block 128 from the calibrator blocks and the calibration constants from equations 2. Thus, the remaining unknowns in equations 3 are the long and short space count rates $N_L$, $N_s$. Furthermore, in block 134 the appropriate $N_L$ was selected based upon the S/H ratio criteria utilized in block 146 as previously explained.

Thus, per block 136, the appropriate rib-spine equations 3 have been defined and, in reference to block 156 of FIG. 3C, they are simply solved to obtain a first value "r" for formation density $\rho$, and a first value for mudcake correction, d.

Once the first density value r and the first $P_e$ value y have been determined at block 146, the relationship of FIG. 5C (obtained from the modeling of FIG. 4) may thereafter be used to modify the first soft-to-hard ratio value x thus eliminating density effects. This step is functionally depicted as block 158 of FIG. 3C. More particularly, with reference to FIG. 5C, this first density value r is utilized with utilized to modify count rate in each energy window between 100-200 Kev to remove the effect of $P_e$ on these rates, as depicted in block 150.

From FIG. 5D, it will be appreciated that, depending upon determination of $P_e$ and the resultant position on $H(P_e)$ curves, any uncertainty in such determination, represented as $\Delta P_e$ may result in a substantially larger uncertainty in $H(P_e)$, shown as $\Delta H(P_e)$. This, in turn, will result in greater uncertainty in modification of count rates, as described, to remove the effect of $P_e$, as performed in block 150.

However, it was noted previously that count rates in the energy of 200-540 Kev are less effected by $P_e$ than are those in the 100-200 Kev range and are more dependent upon formation density. Thus, by selecting count rates in the range of 200-540 Kev for developing an average long space count rate, this uncertainty in effect of $P_e$ may be largely ignored.

One problem associated with thus ignoring counts below 200 Kev to avoid effect of $P_e$, however, is that the statistical fractional count rate error may be shown to vary as $1/\sqrt{N}$, where N is the number of counts. If it were not for the effect of $P_e$ on count rates in the 100-200 Kev region, it would thus be otherwise desirable to include counts in this region to increase total counts, N thereby reducing fractional error.

It will thus be appreciated that a trade-off exists, whereby when limiting count rates to upper energy ranges, the effect of $P_e$ is lessened but, due to reduced number of counts, statistical error increases. Conversely, by including additional counts from the lower energy ranges, statistical error is reduced, but error due to the effect of $P_e$ on count rates in this energy range are increased.

It has been empirically found that if the S/H ratio utilized in determining $P_e$ in block 146 is below 0.25, to reduce overall error in the aforementioned trade-off, it is desirable to utilize count rates between the 100-540 Kev region for determining the average long space count rate to be utilized in the rib-spine equations to determine density and mudcake correction. Alternatively, it has further been found that if the aforementioned S/H ratio is within the range of 0.25-0.35, the trade-off is best effected by utilizing count rates in the 140-540 range for determination of average long space count rate.

While it will be appreciated that other such relationships may be utilized between S/H ratios and energy ranges for selecting the energy range from which long space count rate will be determined, it is a general concept of the present invention to select the energy range from which the long space count rate will be determined as a function of the value of the S/H ratio. Thus, other functional relationships may be derived between the particular S/H value and the energy range utilized for determination of the long space count rate. Block 152 is intended to depict the just described step of selecting energy range from which the long space count rate will be determined as a function of the S/H ratio.

Still further, in accordance with the present invention, the drilling conditions under which the measurements are being taken, e.g., whether there is presence of heavy or light mud, salinity and the like, will determine which energy region for a long space count rate will be preferred for accuracy, and thus, dependent upon the type of condition thus identified to the computer 74, in accordance with block 152, it will function curve 211 defined by the first $P_e$ value y to determine the next S/H ratio value x'.

After the computer processing routine has completed the aforementioned steps through block 158, a loop counter in the software may be incremented by one as shown in block 160. It will be appreciated that in accordance with the processing routine just described, a perturbative process may be entered using the relationships of FIGS. 5B, 5C and 5D. Thus, in each iteration a $P_e$ is obtained from the soft-to-hard ratio. Next, this $P_e$ is utilized to modify count rates whereby a new density is obtained. From this new density value the soft-to-hard ratio is adjusted to a new value and this new soft-to-hard value may then be utilized to obtain a new $P_e$.

Accordingly, continuing with the example depicted in FIGS. 5B, 5C and 5D, once the next S/H value x' has been obtained from FIG. 5C, as described, a next $P_e$ value y' will be obtained in FIG. 5B utilizing curve 205 which corresponds to the currently determined first density value r.

Next, referring to FIG. 5D, this next $P_e$ value y' will be utilized to obtain a next $H(P_e)$ value z'. This new z' value will be utilized to adjust long space count rates per block 150. A particular long space count rate corresponding to an energy range defined by the current S/H value x' will then be selected per blocks 146 and 152.

From this $N_L$ and the aforementioned rib-spine equations, a next density value r' is obtained. This value r' and the current $P_e$ value y' are then utilized in curve 213 of FIG. 5C to derive a next S/H ratio value x''. Then, the current density value r' and S/H ratio x'' are utilized to determine a next $P_e$ value y'' from curve 209 from FIG. 5B, and the process is repeated.

As each perturbation is effected, it will be expected that the density value thus derived will continue changing, however, it will further be appreciated that at some point diminishing returns will set in wherein further refinements in the derived density value will be so little in magnitude as to render such further refinements of little value. In the alternative, due to the processing time requirement of the subroutine between blocks 146 and 162, although further improvements in the density value may be achieved, it may be desirable to truncate this perturbative process after three loops.

Thus, referring to block 162, it will be seen therein that the computer 74 may preferably be programmed in a manner so as to determine whether three iterations on the density have been effected or whether the change in density value thus derived from the previous loop is less than some predetermined accuracy level, such as K. If either three loops have been executed, or in the alternative, the change or refinement in density has dropped below the preselected value of K, then as shown in block 162, further steps to be described will be performed, whereas, if these conditions have not been met, as shown by branch 162A, the perturbative processing routine will continue with return to block 146.

Assuming that branch 162b, in accordance with the decisional criteria of block 162, has been entered, the software, in accordance with block 164, will then determine whether one minute has elapsed since the cesium peak was determined in block 120. If one minute has elapsed, due to anticipated drift in photomultiplier tube gain, the desire to maintain an accurate correlation between voltage and energy spectra, and the like, branch 164b will result in a re-determination of the cesium peak from the spectrum accumulated over the previous minute as depicted in block 166. Thereafter, in like manner to the previous determination of the cesium peak and width, in block 168 a re-determination of the cesium peak will be effected in block 168, and the energy spectrum recalibrated from the previous measurements as shown in block 170, in like manner to the recalibration of block 148.

As hereinbefore noted, the actual cesium peak and width will not shift, and accordingly, any perceived shift in the cesium peak or width in blocks 166 and 168 can, for the most part, be attributable to changes in gain of the photomultiplier detector which, in turn, may be attributable to variations in the high voltage supply 36 to the detector assembly 22. Accordingly, once the energy spectrum has been recalibrated as in block 170, an appropriate high voltage control signal 16a may be generated at the surface, as depicted in block 172 of FIG. 3 and delivered to the high voltage control 44 so as to maintain a relatively constant correlation between the detector voltage and the energy spectrum throughout the derivation of logging data.

Returning to block 164, if one minute has not elapsed since the prior cesium peak determination, it will be assumed that sufficient detector drift has not occurred to require a re-determination of the cesium peak and width, and accordingly, the routine will execute branch 164a. Regardless of whether a new cesium peak and width has been determined or not, in any event after exit from block 164, the computer 74 will generate a command signal causing the tool to move to the next depth interval, as indicated by block 174, whereupon the data collection step indicated at block 138 will be reentered in order to collect logging data for the next borehole level of interest.

It will be appreciated from the foregoing that a change in the gamma ray detector transfer characteristics due to variations in high voltage supplies such as drift and the like, will result in apparent shifts in the cesium monitor peak locations such as the channel locations corresponding to the various A–D converters. Moreover, also as previously indicated, such shifts may be corrected for by adjusting the high voltage supplies in response to the control signals derived from detection of the monitor peaks so as to bring these perceived cesium monitor peak energy locations into the appropriate range or channel/window location. However, it should be further appreciated that rather than utilizing the aforementioned control signals for adjusting the high voltage supplies to the detectors to reduce the changes in the transfer characteristics of the detectors, in the alternative, the detectors may be permitted to drift and compensation for the response therefor effected by adjusting, by means of software, the data generated from the detectors.

More specifically, with reference to FIG. 1, for example, the control signal line 16a is shown therein delivering the control signal for adjusting the high voltage control 44 to maintain the response of the photomultiplier tube detectors at a relatively consistent level. However, in the alternative, this control signal 16a may be utilized internally of the computer 74 to "artificially" adjust the interrelationship of the count rates at the various energy levels. More particularly, as but one example, the computer 74 may have determined that over a given interval of time the peak location of the cesium monitor source peak has shifted from, for example, channel no. 24 to channel no. 26, thus indicating drift in the high voltage supply to the detector, for example. Rather than readjusting the high voltage supply in response to control signal 16a, in the alternative, or in combination therewith, the computer 74 may simply adjust the data stored therein to compensate for this shift whereby in reality the apparent shifted location of the cesium monitor source energy peak to channel 26 and the attendant shift of other count rates in other energy bands may be compensated for by means of software.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

The embodiments of the invention in which an exclusive property or privilege is claimed are defined as follows:

1. A method of investigating subsurface earth formations traversed by a borehole, comprising:

introducing a first plurality of photons into said formation;

introducing a second plurality of photons into said borehole having a known energy peak;

generating during a first time interval first electrical signals representing energy of photons from said second plurality and from a third plurality of photons from said formation;

detecting said energy peak from said first electrical signals;

generating during a second time interval second electrical signals representing energy from photons from second plurality of photons;

detecting said energy peak from said second electrical signals;

comparing said detected energy peaks from said first and second electrical signals; and generating a control signal in response to said comparison.

2. The method of claim 1, further including generating during a third time interval in response to said control signal third electrical signals representing energies of photons from a fourth plurality of photons from said formation.

3. The method of claim 2, wherein said first and second electrial signals are transmitted to the surface prior to each respective said detection of said energy peak.

4. The method of claim 3, wherein the energies of said third and fourth pluralities of photons are substantially in the range of 60–660 Kev.

5. The method of claim 4, wherein:

said control signal comprises a signal for adjusting magnitude of a photomultiplier tube high voltage supply; and wherein said step of generating said third electrical signals in response to said control signal comprises adjusting said magnitude of said supply in response to said control signal; and thereafter detecting by means of said photomultiplier tube said energies of photons from said fourth plurality of photons.

6. The method of claim 5, further including:

generating digital representations corresponding to said third electrical signals; and adjusting magnitude of said digital representations as a function of said control signal.

7. The method of claim 3, wherein said first and second signals are digitized within said borehole prior to said transmission.

8. The method of claim 7, wherein said step of generating said second electrical signal is performed after a predetermined time interval has elapsed from said generation of said first electrical signals.

9. The method of claim 8, wherein said first signals are generated at a first depth within said borehole; and at least one set of said third electrical signals are generated at a second depth within said borehole prior to said elapsed time interval.

10. Apparatus for investigating subsurface earth formations traversed by a borehole, comprising:

first gamma ray source means for introducing photons into said formation;

second gamma ray source means for introducing photons into said borehole having a known energy peak;

detector means for generating electrical signals each representing energy of a photon from said second source means and from said formation;

communication means for transmitting said electrical signals to the surface;

peak detector means for detecting said energy peaks from said electrical signals;

comparator means for comparing energy levels of said energy peaks from said electrical signals generated at different times; and control signal generator means for generating a control signal in response to said comparison.

11. The apparatus of claim 10, wherein said electrical signals generated by said detector means correspond to photon energies substantially between 60 to 660 Kev.

12. The apparatus of claim 11, further including digitizing means interconnected between said detector means and said communication means for digitizing said electrical signals prior to said transmission.

13. The apparatus of claim 12, wherein said detector means comprises:

a photomultiplier tube and a variable high voltage supply; and wherein magnitude of said high voltage supply is controlled in response to said control signal.

14. The apparatus of claim 13, further including timer means for determining when elapsed time between said comparison of said energy peaks has exceeded a predetermined value.

15. The apparatus of claim 14, further including means for adjusting magnitudes of said digitized electrical signals in response to said control signals.

16. The apparatus of claim 15, further including means for initiating peak detection of said peak detector means when said elapsed time has exceeded said predetermined value.

17. The apparatus of claim 16, further including means for initiating said adjustment of magnitudes of said digitized electrical signals when said elapsed time has exceeded said predetermined value.

18. The apparatus of claim 17, further including means for initiating adjustment of said magnitudes of said high voltage supply when said elapsed time has exceeded said predetermined value.

19. The apparatus of claim 18, wherein said detector means is a long space detector, and wherein said apparatus further includes a second detector means for detecting photons traversing a short space, and wherein said second detector means comprises a second photomultiplier tube and a second variable high voltage supply, and further wherein the magnitude of said second high voltage supply is controlled in response to said control signal.

20. The apparatus of claim 19, further including means for initiating adjustment of said magnitude of said second high voltage supply when said elapsed time has exceeded said predetermined value.

* * * * *